Aug. 8, 1944.   W. D. HARPER   2,355,528
VEHICLE BODY SUPPORT
Filed Jan. 8, 1941
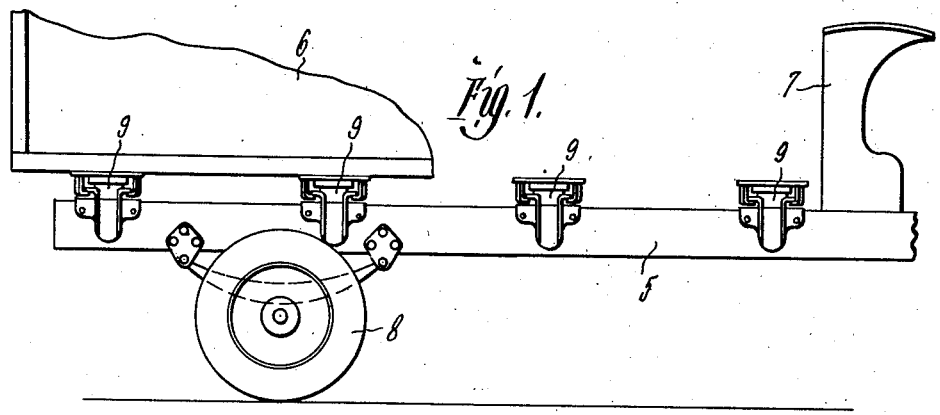
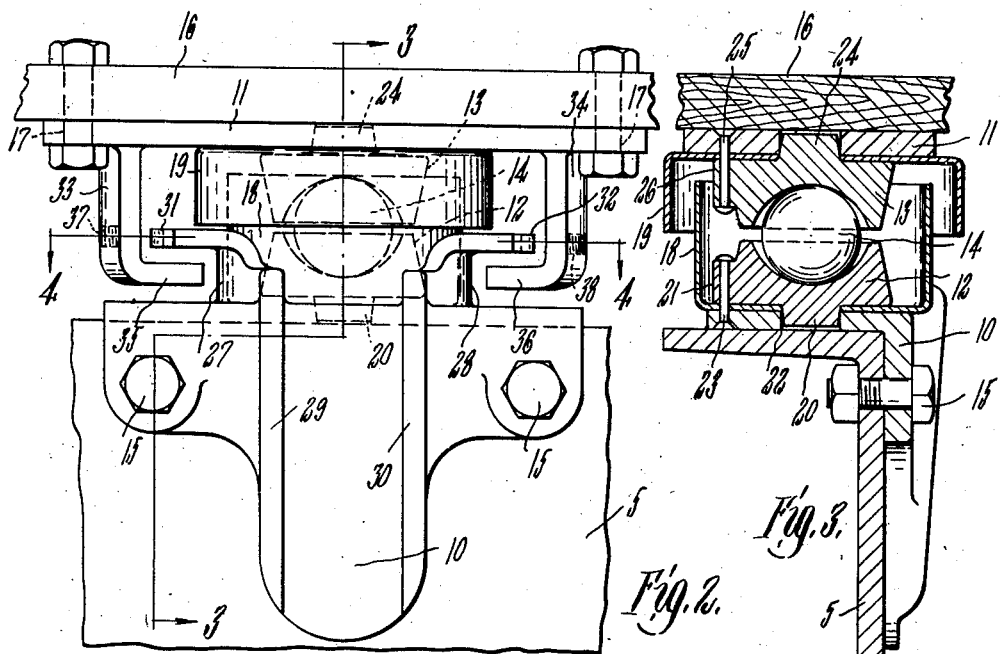
Inventor
William D. Harper
by Wright, Brown, Quinby & May
Attys.

Patented Aug. 8, 1944

2,355,528

UNITED STATES PATENT OFFICE 2,355,528

VEHICLE BODY SUPPORT

William D. Harper, Wellesley, Mass.

Application January 8, 1941, Serial No. 373,523

6 Claims. (Cl. 296—35)

The present invention relates to means for supporting the body of a vehicle on the frame or chassis of the vehicle so as to permit limited and yieldingly restrained movements of the body horizontally for the purpose of softening shocks and easing the movements of the body as the vehicle travels over the road. More particularly it is an improvement in the invention for which Patent No. 1,695,373 was granted to me December 18, 1928, and has the specific objects of increasing the security, ease and accuracy of mounting the cooperating parts of the support on the chassis and body, of increasing the ruggedness of the appliance, and of furnishing new and superior means for preventing separation of the vehicle body from the chassis under the conditions of rough usage.

The principles of the invention and the particulars in which it consists are explained in the following specification with reference to a concrete embodiment, which is illustrated in the accompanying drawing.

In the drawing,

Fig. 1 is a fragmentary side elevation of an automotive truck to which the invention has been applied;

Fig. 2 is a side elevation on a larger scale of one of the supports containing the invention;

Fig. 3 is a cross section taken on line 3—3 of Fig. 2;

Fig. 4 is a horizontal section taken on line 4—4 of Fig. 2.

Like reference characters designate the same parts wherever they occur in all the figures.

In Fig. 1, the reference character 5 designates one of the longitudinal side members of the chassis of an automotive truck; 6 designates a fragment of the superposed body; 7 the cab of the truck, and 8 one of the rear wheels. The body is supported with freedom for limited movement horizontally in all directions by a number of supports, or supporting units, which I call hangers. Each such supporting unit is an assemblage of parts, and the several assemblages are designated as a whole in Fig. 1 by the reference character 9. These supports are mounted on both of the side members of the chassis, and may be located on other parts thereof as well, in sufficient numbers to support the body properly and distribute the load so that no single supporting unit will be overloaded.

The details of one supporting unit are shown in Figs. 2, 3 and 4, all such units wherever applied being preferably alike; although they may differ in some particulars, as later appears. The unit here shown comprises a bracket or holder 10, which is secured to the side member 5, a second bracket or holder 11, in the form of a plate, secured to the under side of the body, an upright cup 12 secured to the bracket 10, an inverted cup 13 secured to the plate 11 and a ball or sphere 14 in and between the two cups, resting on the upright cup 12 and supporting the inverted cup 13 with suitable clearance between the cups. The bracket 10 may be of angle formation, as shown, adapted to rest on the upper side and bear against the outer side of the chassis member 5 or equivalent beam or girder, or may be formed to bear on the upper side only of that member, and it is secured thereto by suitable means, such as the bolts 15 and nuts here shown, welding, or otherwise. The plate 11 is adapted to be placed against the under side of a structural part of the body, such as a longitudinal beam or girder 16 thereof, or a cross beam, and to be secured by bolts 17 passing through the member 16. The term "bracket" as used in this specification includes both the specific bracket 10 shown in the drawing and the plate 11, as well as other holders which may be of different forms but have the same function.

The ball cups 12 and 13 contain spheroidal sockets or chambers having a long radius of curvature in the central portion and decreasing radii of curvature toward the rim. Such radius of curvature at the central portion is longer than the diameter of the ball and the radius at the intersections of radial planes with the plane of the cup rim is shorter than the diameter but longer than the radius of the ball; while the circumference at the rim is greater than that of the ball in the same plane. Thus the ball is able to roll on the lower cup, and the upper cup to roll on the ball, when acted upon by a horizontal component of force, freely and with slight resistance initially, but with rapidly augmented and increasing yielding resistance, applied by the force of gravity, as the cups are relatively moved further from their central vertical alinement. In these respects the device of this invention embodies the principles of my prior patent before specified.

An upright cup 18 for holding oil or grease embraces the lower cup 12 and the lower portion of the inverted upper cup 13. To distinguish these cups from one another by descriptive terms, the cups 12 and 13 are called bearing cups and the enveloping cup 18 is called the lubricant cup. An inverted cup shaped shield 19 is arranged to embrace the upper bearing cup and the upper portion of the lubricant cup. Suitable clearance is provided between the cups 13 and 18, and between cup 18 and the shield 19, to permit, without interference, lateral movement of the upper bearing cup and of the vehicle body to the limit permitted by the formation of the ball and the ball chambers in the bearing cups.

An important feature of the invention resides in the construction and assemblage of the bearing cups with the bracket 10 and top plate 11 respectively, or with equivalent holders to which the cups may be secured. Each bearing cup is formed with a tapered boss 20 protruding from the center of its base, that is, the outer end face or end opposite to that in which the ball recess is formed, and external bosses or lugs 21 are formed at intervals around its circumference. Preferably there are three, but may be more or fewer, such lugs spaced equiangularly around the circumference as represented in Fig. 4. A hole 22 is provided in the horizontal part of bracket 10 larger in diameter than the extremity of the boss 20, but preferably smaller, and at the most not appreciably greater, than the base diameter of the boss. The end wall of the lubricant cup 18 is also provided with a central hole of the same diameter as the hole 22, or possibly slightly larger. In assembling these parts, the lubricant cup is placed on the upper surface of the bracket, the boss is entered into the registering holes therein, and said boss is then driven into the holes until the base of the bearing cup, the end wall of the lubricant cup, and the top surface of the bracket are brought into firm contact. Rivets 23 are then passed through passages in the respective lugs 21 and through alined holes in the bracket, and headed over to retain them. By this means the bracket, the lubricant cup and the bearing cup are secured together in an exceedingly strong and rigid manner which prevents the bearing cup from breaking loose or being tilted.

The upper bearing cup, the top plate 11 and the shield 19 are interengaged and secured together in the same manner by means of a tapered boss 24 on the base of the bearing cup and rivets 25 passing through external lugs 26 on this cup and through the plate 11, substantially as shown by Fig. 3. The cup shaped shield 19 has an end wall which is secured between the bearing cup and the top plate 11 in the same manner as the end wall of the lubricant cup is gripped.

On the upper side of the bracket 10 rising webs 27 and 28 are formed in connection and continuation with stiffening ribs 29, 30, on the lateral web of the bracket. Said rising webs embrace the lubricant cup 18 and are located at opposite sides thereof. They carry outwardly projecting horizontal flanges or lips 31 and 32. Depending webs 33 and 34 are formed on the under side of the top plate 11 in an arrangement to embrace the flanges 31 and 32, and they are formed with inwardly projecting lips or flanges 35 and 36 underlying the flanges 31 and 32 respectively. Sufficient clearance is left between the flanges and webs to permit the fullest possible lateral and rising movement of the vehicle body with respect to the chassis. The overlapping pairs of flanges 31—35 and 32—36 constitute a lock preventing the body from jumping high enough, in consequence of road shocks, to permit escape of the ball from the bearing cups. The means previously used for this purpose have been insufficiently rugged and have been difficult to assemble. The improved interlocking elements here shown are amply strong and rugged and are easily assembled. Maximum strength with minimum weight results from the manufacture of the locking flanges in integral union with the bracket 10 and plate 11 respectively, and from the formation of the webs 27, 28 and 33, 34 through which such flanges are so united. They are brought to the relationship shown in the drawings by locating the flanges 35 and 36 in the spaces adjacent to and between flanges 31 and 32, before bringing them across the plane of the latter flanges, and then turning the plate until the flanges are superposed. These flanges subtend only a small fraction of a circle surrounding the common axis of the bearing cups, which permit them to be thus interleaved. Although if desired, in order to obtain greater strength, they may be extended until each flange contains nearly 90° of circular area.

Tapped holes 37 and 38 pass through the webs 33 and 34. These holes are in the same plane with the flanges 31 and 32 and at opposite ends of a diameter of the bearing cups when the parts are correctly assembled. Notches 39 and 40 are provided in the outer edges of the flanges 31 and 32 in the same diameter. Screws 41 and 42 are adapted to be threaded through said holes and to enter the said notches. Said screws are used to retain the support in assembled position and facilitate mounting it on a vehicle. With the bearing cups in alinement, the position which they tend to assume by virtue of the ball and the curvature of the ball chambers, the screws 41 and 42 are set up until they enter the notches in, and bear hard against, the flanges 31 and 32. Then the parts are prevented from relative movement. While so unified, the assembled support is applied and bolted to the chassis and body of the vehicle. If holes for the bolts 15 and 17 have not previously been made, the rigid assemblage of the support enables them to be located with great accuracy, and enables all the supporting units of the same vehicle to be accurately and exactly correlated with one another so that all will function in the same way. Thereafter the screws 41 and 42 are removed, leaving the upper bearing cup free to move horizontally in any direction with respect to the lower cup, and to rise as the ball rolls up the slope of the socket in the lower cup and the upper cup rides up on the ball.

It will be understood that the relationship of the webs and flanges last described may be reversed within the scope of the invention. That is, the inner webs and outwardly projecting flanges may be provided on the upper bracket, and the embracing webs and inwardly projecting flanges on the lower bracket. Furthermore, it is not essential that a bracket or support separate from the chassis or base frame be used, for the latter may be provided with holes or sockets of the same nature as the hole 22, into which the boss of the lower bearing cup may be driven directly, and the cup may be connected by rivets, or otherwise additionally secured, directly to the contiguous part of the chassis. This alternative equivalent of the construction first described may be employed in situations where the vehicle is designed to be equipped with hangers of this invention at the factory of its origin. Likewise, the body may be similarly constructed for direct connection with the inverted upper bearing cup of the hanger. The combination including separate holders or brackets, such as those shown, can be applied, not only at the factory of origin, but also accessorily after the machine has been delivered to the user.

What I claim and desire to secure by Letters Patent is:

1. A vehicle body support comprising opposite brackets adapted to be mounted on the top of a base structure and on the under part of a superposed structure, bearing cups in alinement with each other connected by rivets to the respective brackets, said cups having in their contiguous ends ball recesses of oblate spheroidal contours and having tapered bosses projecting from their bases in driven-fitted engagement with the respective brackets, a ball contained within the recesses of both cups, webs projecting from each bracket at opposite sides of its connected cup toward the other bracket, the web so projecting from one bracket being outside of the webs projecting from the other bracket, flanges projecting outwardly from the inner webs and flanges projecting toward one another from the outer webs, said outwardly projecting flanges being overlapped with respect to the inwardly projecting flanges and spaced apart from them sufficiently to permit a limited movement of one bracket both laterally with respect to, and away from, the other bracket.

2. A unit for supporting a body on a base structure comprising a bracket, a bearing cup having a tapered boss in driven-fitted engagement with a hole in said bracket, rivets securing said cup to said bracket, outwardly projecting flanges in integral union with said bracket at opposite sides of said cup spaced away from the bracket, a second bracket, an inverted bearing cup secured to the second bracket by rivets and a driven-fitted tapered boss, integral projections extending from said second bracket toward the first bracket at opposite sides of the second named cup and outside of the before named flanges, flanges extending toward one another from said projections between the first named bracket and the first named flanges, and a ball interposed between and in said cups.

3. A vehicle body support comprising opposite brackets adapted to be mounted on the top of a base structure and on the under part of a superposed structure, bearing cups secured to the respective brackets in alinement with their cavities facing toward each other, said cups having tapered bosses projecting from their bases into holes of a diameter intermediate the largest and smallest diameters of the bosses in the respective brackets, rivets engaged with the cups and respective brackets preventing withdrawal of the bosses from said holes, a ball contained within the recesses of both cups in contact with the bounding surfaces of the recesses, webs extending from each bracket axially of the cups toward the other bracket, the webs so extending from one bracket being outside of the webs extending from the other bracket, flanges projecting outwardly from the inner webs at diametrically opposite sides of the axes of the cups, and flanges projecting toward one another from the outer webs in locations at diametrically opposite sides of said axes, said outwardly projecting flanges being overlapped with respect to the inwardly projecting flanges and spaced apart from them sufficiently to permit movement of one bracket both laterally with respect to, and away from, the other bracket; the flanges of each pair having a width circumferentially around the cups narrower than the circumferential width of the spaces between the flanges of the other pair, whereby to permit assemblage of the flanges in the previously described overlapping relationship.

4. A supporting unit for a vehicle body comprising opposed holders separated from each other, one of said holders having spaced apart webs extending toward but terminating short of the other and flanges projecting outwardly from said webs in the space between the holders, the other holder having webs projecting toward but terminating short of the first-mentioned holder, outside of and spaced away from the before-named flanges, with flanges extending inwardly into the spaces between the first-named flanges and the first-mentioned holder, with clearances between themselves and the first-named flanges, the first-named holder and the first-named web, the flanges of both holders being angularly spaced around a common axis with the angular spaces between the flanges of each sufficiently wide to permit passage of the flanges of the other holder, a bearing cup abutting against each holder between the webs thereof with its cavity facing toward the cup of the other holder, each cup having a tapered boss extending into, and bearing at its sides against the rim of, a hole in the abutting holder, and being additionally secured to such holder, and a ball between the cups entering the cavities of both and abutting against the bounding walls of such cavities.

5. In a supporting unit for a vehicle body, opposed holders separated from each other, one of said holders having spaced apart webs extending toward but terminating short of the other and flanges projecting outwardly from said webs in the space between the holders, the other holder having webs projecting toward but terminating short of the first-mentioned holder, outside of the before-named flanges, with flanges extending inwardly into the spaces between the first-named flanges and the first-mentioned holder, there being clearances between the flanges and webs sufficient to permit limited movement of one holder relative to the other in all directions, the flanges of both holders being angularly spaced around a common axis with the angular spaces between the flanges of each sufficiently wide to permit passage of the flanges of the other holder, said holders being adapted to support opposed bearing cups with a ball in and between the cups, for the purpose set forth.

6. The combination of two cooperating holders for opposed ball-receiving cups of a supporting unit, each of said holders having a hole for the reception of a boss protruding from the outer end of one of said cups and the two holders being relatively located, when in operative assemblage with such cups, with a space between them in which the cups are received, and having spaced apart webs extending toward the other holder, the webs of one holder being provided with outwardly projecting flanges spaced apart from that part of the holder from which the webs project, and the webs of the other holder being located to embrace said flanges and being formed on their extremities with inwardly projecting flanges adapted to enter the spaces between the first-named flanges and the holder supporting them; the flanges of both holders being angularly spaced about a common axis extending perpendicularly to the holders, with the angular spaces between the flanges of each sufficiently wide to permit passage of the flanges of the other holder, and the webs and flanges being spaced from each other and from the holders with clearances sufficient to permit limited relative movement between the holders lengthwise of such common axis and in all directions transverse thereto.

WILLIAM D. HARPER.